United States Patent
Boyer, Jr.

(10) Patent No.: US 7,641,047 B1
(45) Date of Patent: Jan. 5, 2010

(54) INTERLOCKING MEMBER PROTECTIVE BLADE COVER

(76) Inventor: Ronald S. Boyer, Jr., 213 Ridge View La., Northumberland, PA (US) 17857-1825

( * ) Notice: Subject to any disclaimer, the term of this patent is extended or adjusted under 35 U.S.C. 154(b) by 371 days.

(21) Appl. No.: 11/799,409

(22) Filed: May 1, 2007

Related U.S. Application Data

(60) Provisional application No. 60/798,368, filed on May 5, 2006.

(51) Int. Cl.
*B23Q 13/00* (2006.01)
*B27G 19/02* (2006.01)

(52) U.S. Cl. .......................... 206/349; 30/390

(58) Field of Classification Search ............... 206/401, 206/349, 352, 453, 586, 303; 30/382, 390; 83/830; 474/232, 209
See application file for complete search history.

(56) References Cited

U.S. PATENT DOCUMENTS

| | | | |
|---|---|---|---|
| 3,659,112 A * | 4/1972 | Stedman | 305/202 |
| 4,043,215 A * | 8/1977 | Long et al. | 474/218 |
| 5,456,057 A | 10/1995 | Bannon et al. | |
| 6,443,795 B1 * | 9/2002 | Lin | 446/85 |
| 6,454,327 B1 | 9/2002 | Chang | |
| 7,155,880 B2 | 1/2007 | Curtsinger et al. | |
| 2003/0126952 A1 * | 7/2003 | Duquet | 76/112 |
| 2005/0164816 A1 * | 7/2005 | Wang | 474/234 |

\* cited by examiner

*Primary Examiner*—Mickey Yu
*Assistant Examiner*—Steven A. Reynolds
(74) *Attorney, Agent, or Firm*—Wendy W. Koba

(57) ABSTRACT

A protective cover for a saw blade is formed of a plurality of interlocking members, linked together to form a chain of a length sufficient to completely surround a given blade, where the sharp edge of the blade is then encases within the interior region of the linked members. A specially-designed "master link" is used to join the two ends of the chain together and "lock" the cover in place around the blade edge. Links may be added to, or removed from, a chain to properly size the cover with respect to the blade. The links are preferably formed of a hard plastic material and are injection molded.

7 Claims, 4 Drawing Sheets

INTERLOCKING MEMBER PROTECTIVE BLADE COVER

CROSS-REFERENCE TO RELATED APPLICATION

This application claims the benefit of U.S. Provisional Application No. 60/798,368, filed May 5, 2006.

TECHNICAL FIELD

The present invention relates to a protective cover for a saw blade and, more particularly, to a protective blade cover formed of a plurality of interlocking members (links) so as to easily conform to virtually any blade design, with the ability to add/delete links as a function of the size and shape of the blade.

BACKGROUND OF THE INVENTION

Saw blades come in a variety of shapes and forms. For example, saw blades can be of the circular type that have teeth that extend around the periphery of the circular saw blade. Saw blades can also be of the reciprocating type that are linear and have teeth along one peripheral edge of the linear blade. The teeth on the saw blades are sharp and can injure a person handling the blades if care is not exercised. Additionally, the sharp teeth on the saw blades can damage other objects or goods that inadvertently come in contact with the teeth. Furthermore, the teeth may have special tips, such as carbide tips, that can be damaged if the blade is mishandled or dropped. Other saw blades may not include teeth, but instead have a finely-sharpened cutting edge.

There are many occasions where a saw blade needs to be disengaged from the remainder of a cutting machine. For example, in butchering applications, a meat cutting blade must frequently be removed from the cutter to clean both the blade and the remaining pieces of the machinery. Beyond cleaning applications, there are times when a blade must be removed from a saw to be sharpened, or replaced with a different type and/or size of saw blade.

In each of these cases, the handling of the saw blade is problematic and requires an individual to wear protective gloves to prevent any accidental contact with a sharp edge (with or without teeth). One prior art approach to solving the problem of handling saw blades is disclosed in U.S. Pat. No. 5,456,057, issued to G. B. Bannon et al. on Oct. 10, 1995. In this case, a protective saw blade cover is formed of a section of flexible plastic tubing that has a single cut through the tubing wall along the length thereof. The tubing is wrapped around the periphery of the saw blade and provides a protective cover for the outer periphery/teeth of the saw blade. Because the tubing has a circuit cross section—while the saw blade itself is relatively flat—the tubing cannot provide a close fit to the blade, and may become accidentally disengaged. Depending on the composition of the plastic material, this approach may also be somewhat cumbersome in terms of fitting around oddly-dimensioned blade peripheries. The flexible plastic material, moreover, may deteriorate over time, due to environmental or aging factors.

Thus, a need remains in the art for a protect cover for saw blades that is able to accommodate various blade designs, fully encases the saw tips and is relatively simple to use.

SUMMARY OF THE INVENTION

The needs remaining in the art are addressed by the present invention, which relates to a protective cover for a saw blade and, more particularly, to a blade cover formed of a plurality of interlocking members/links so as to easily conform to virtually any blade design, with the ability to add/delete links as a function of the size of the blade.

In accordance with the present invention, a plurality of interlocking members are linked together to form a chain of a length sufficient to completely surround a given blade. A specially-designed "master link" is used to join the two ends of the chain together and "lock" the cover in place.

In a preferred embodiment of the present invention, the links are formed of a hard plastic material. It is an advantage of this embodiment of the present invention that the interlocking members may be formed using injection molding, and can therefore be formed of any desired dimensions, particularly with respect to the inner cavity required to fully engage a blade edge.

Further, it is possible to form the links of any desired color, allowing for color-coding to be used to define the size of the link, so that an individual is able to make a "chain" of like-sized (i.e., like-colored) links, avoiding any confusion by having one or two links of an improper dimension included along the chain.

Other and further advantages and aspects of the present invention will become apparent during the course of the following discussion and by reference to the accompanying drawings.

BRIEF DESCRIPTION OF THE DRAWINGS

Referring now to the drawings.

DESCRIPTION OF INVENTION

Figure 1:
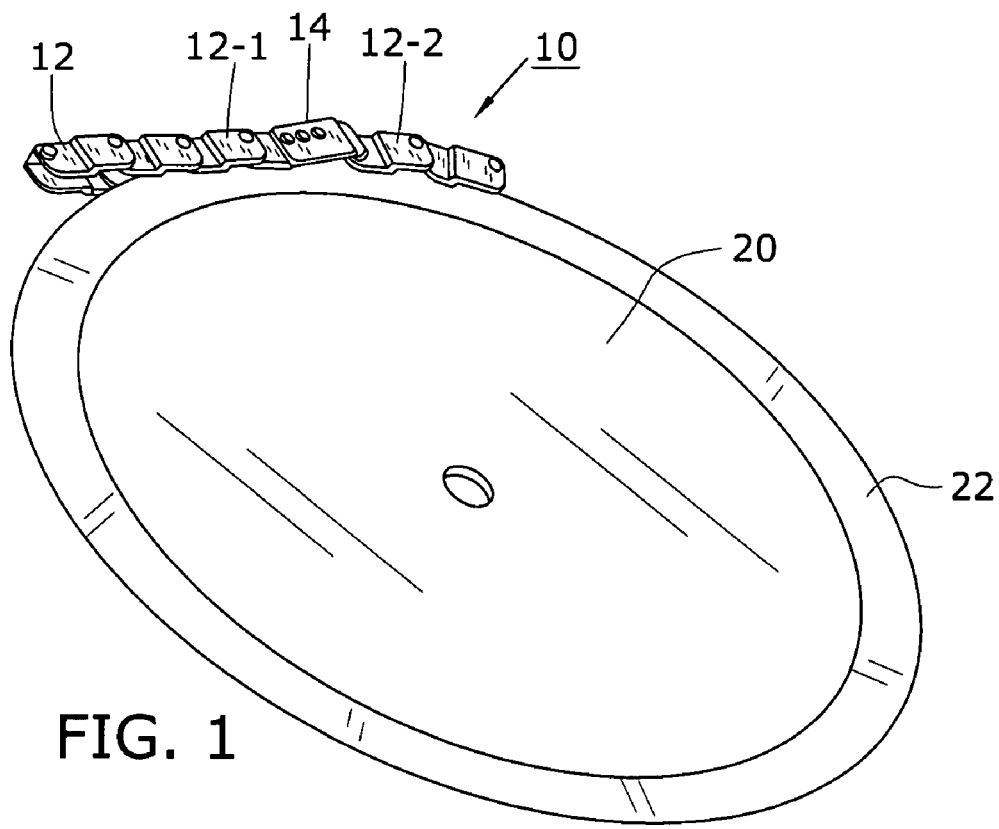
FIG. 1 illustrates a portion of an exemplary blade cover formed in accordance with the present invention, as it encircles a blade edge.

FIG. 1 illustrates an exemplary protective blade cover 10 formed in accordance with the present invention, comprising a plurality of interlocking link members 12 that are "chained" together to form a length sufficient to surround a blade periphery. It is to be understood that only a portion of cover 10 is illustrated, for the sake of clarity. A master link assembly 14 is used to connect opposing end links 12-1 and 12-2, and provide a secure and immovable covering around a blade.

Referring to FIG. 1, a blade 20 is shown as including a sharp edge 22, which may or may not comprise separate blade teeth. Protective blade cover 10 of the present invention is illustrated as engaging sharp edge 22 of blade 20 in a manner such that the outer portion of edge 22 is inserted within (and thus fully encased by) the interior portion of link members 12. Therefore, once master link assembly 14 has been joined to links 12 and locked in place, blade 20 may be handled by grasping cover 10, protecting an individual from coming into direct contact with edge 22 and allowing for blade 20 to be handled with minimal concern.

Figure 2:
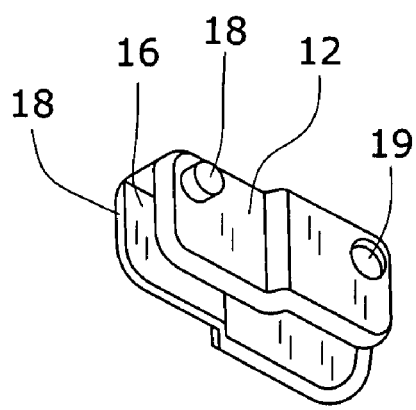
FIG. 2 is an isometric view of an exemplary link used to form the inventive protective blade cover.
Figure 3:
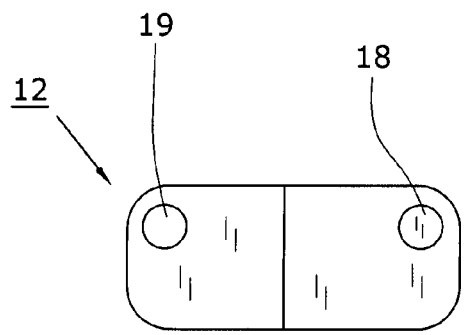
FIG. 3 is a side view of the link of FIG. 2.
Figure 4:
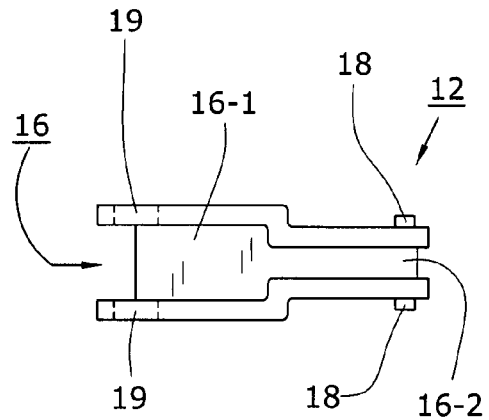
FIG. 4 is a bottom view of the link of FIG. 2.
Figure 5:
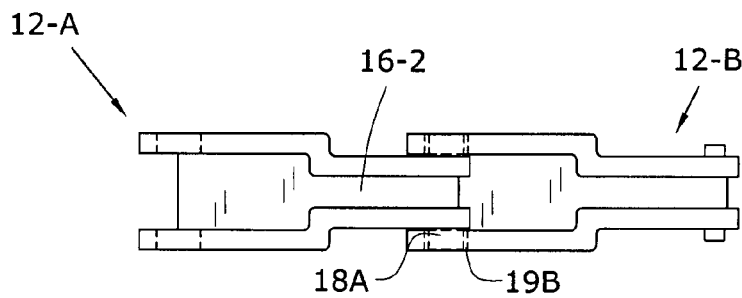
FIG. 5 contains a bottom view of a pair of links joined together, particularly illustrating the dimensions used to provide the mating.

A single exemplary link 12 formed in accordance with the present invention is illustrated in the isometric view of FIG. 2. The interior region 16 of link 12 is particularly shown and is sized, in accordance with the present invention, so that blade edge 22 will fit within interior region 16. Link 12 also includes a pair of pivot pins 18 and a pair of opposing openings 19, where as the links are fit together, pivot pins 18 will mate with openings 19 of the adjacent link. By properly controlling the size and dimensions of the individual links, a blade cover 10 can be formed that will easily bend to cover a blade of any common radius. FIG. 3 is a side view of link 12, illustrating in particular the relationship of the size of pivot pin 18 and opening 19 to link 12. FIG. 4 is a bottom view of link 12, illustrating in particular interior region 16. As shown, a first portion 16-1 of region 16 is of larger dimension than a second portion 16-2, so that links 12 will properly mate when joined together. Indeed, FIG. 5 is a bottom view of a pair of links 12-A and 12-B mated together, showing how portion 16-2 of link 12-A fits within portion 16-1 of link 12-B. As shown, pivot pins 18-A of link 12-A will "snap fit" in place within pivot apertures 19-B of link 12-B, while allowing for links 12-A and 12-B to pivot with respect to one another.

Figure 6:
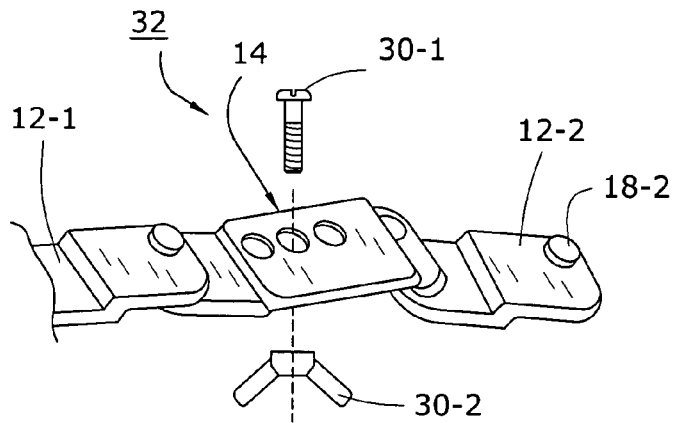
FIG. 6 is an isometric view of an exemplary master link assembly used as the locking mechanism for the protective blade cover of the present invention.
Figure 7:
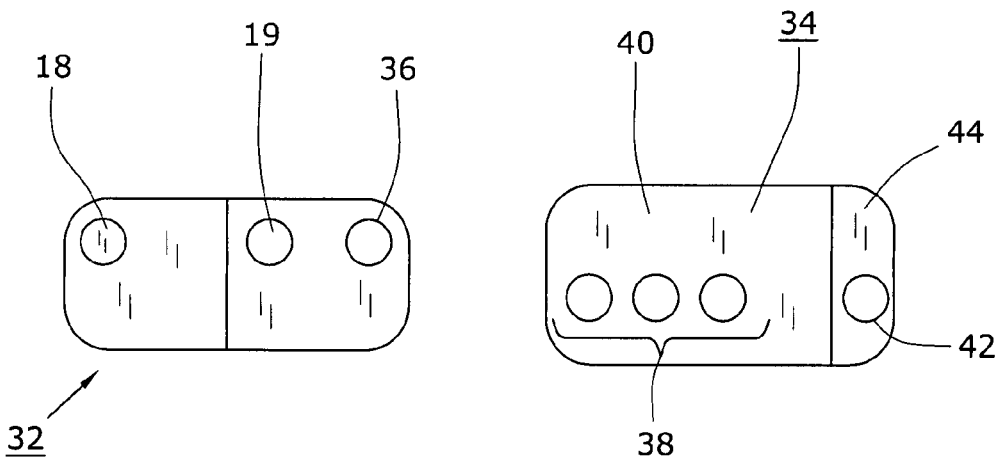
FIG. 7 is an exploded side view of the exemplary master link assembly of FIG. 6, illustrating both the joining element and the fitting element.
Figure 8:
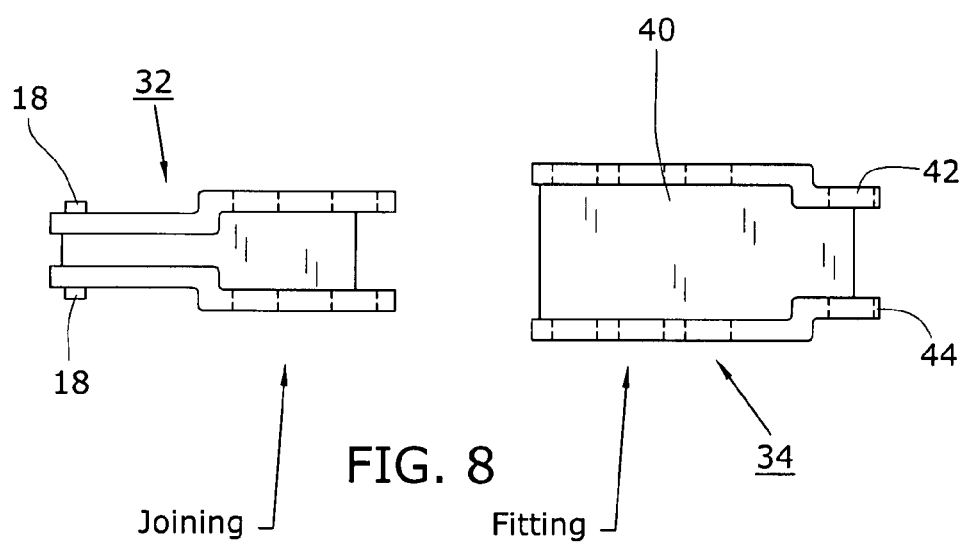
FIG. 8 is an exploded bottom view of the master link assembly of FIG. 6.

FIG. 6 is an isometric view of an exemplary master link assembly 14 formed in accordance with the present invention, which is used to join together opposing terminal links 12-1 and 12-2 and form the completed protective blade cover 10 of the present invention. FIG. 7 is an exploded side view of master link assembly 14, and FIG. 8 is an exploded bottom view of assembly 14. As particularly shown in FIG. 6, master link assembly 14 includes a locking mechanism 30 that functions to provide the final connection, in this case using the combination of a threaded screw 30-1 and wing nut 30-2 to secure protective blade cover 10 in place against a given saw blade. It is to be understood that various other locking/latching mechanisms may be used to attach the components of master link assembly 14 and fall within the spirit and scope of the present invention.

FIGS. 6-8 all show master link assembly 14 as comprising two separate and distinct components, a joining component 32 and a fitting component 34. As best illustrated in FIGS. 7 and 8, joining component 32 can be thought of as an "extended" version of link 12, with an additional pair of openings 36 formed adjacent to openings 19. Fitting component 34 includes a plurality of pairs of openings 38 formed in a first section 40, where first section 40 has a wider interior portion 41, as best seen in FIG. 8. A separate pair of openings 42 is formed in a second section 44 of fitting component 34.

Figure 9:
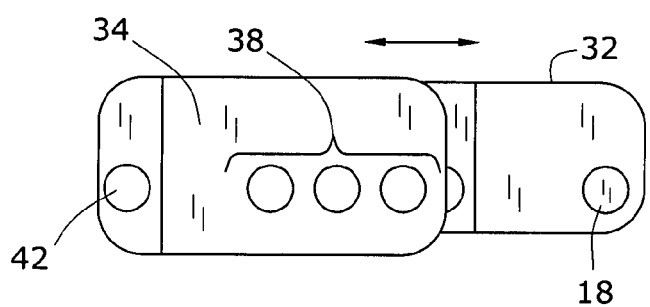
FIG. 9 is a side view of the master link assembly, as the joining and fitting elements are coupled together.

In accordance with the present invention, openings 42 of fitting component 34 mate with pivot pins 18 of a first terminal link 12, such as link 12-1. In similar fashion, pivot pins 18 of joining component 32 mate with openings 19 of the opposing terminal link 12, such as link 12-2. Closure of master link assembly 14 to enable a tight fit of protective blade cover 12 to blade 20 is provided in accordance with the present invention when first section 40 of fitting component 34 is inserted over joining component 32, as shown in FIG. 9. By virtue of having a plurality of openings 38 in first section 40, components 32 and 34 can be moved laterally with respect to one another, illustrated by the doubled-ended arrow in FIG. 9, until the proper openings overlap that are required to provide the desired tight fit. Once the proper openings are aligned, locking mechanism 30 (such as threaded screw 30-1 and wing nut 30-2) is inserted through the aligned openings to fix protective cover 10 to blade 20.

Figure 10:
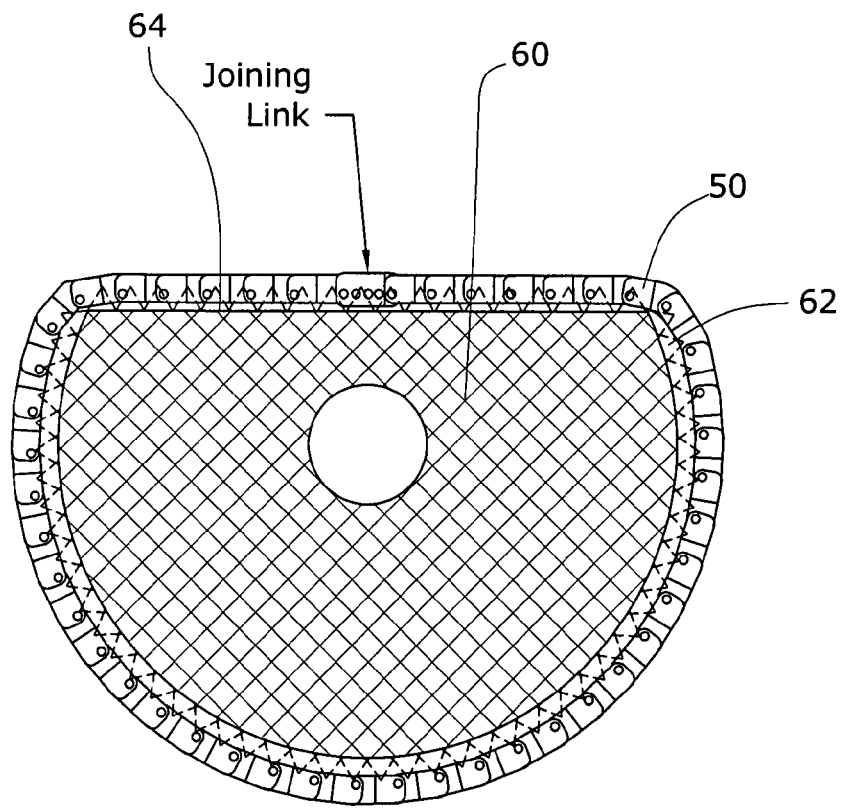
FIG. 10 illustrates an alternative protective blade cover configuration of the present invention, for use with a segmented blade.
Figure 11:
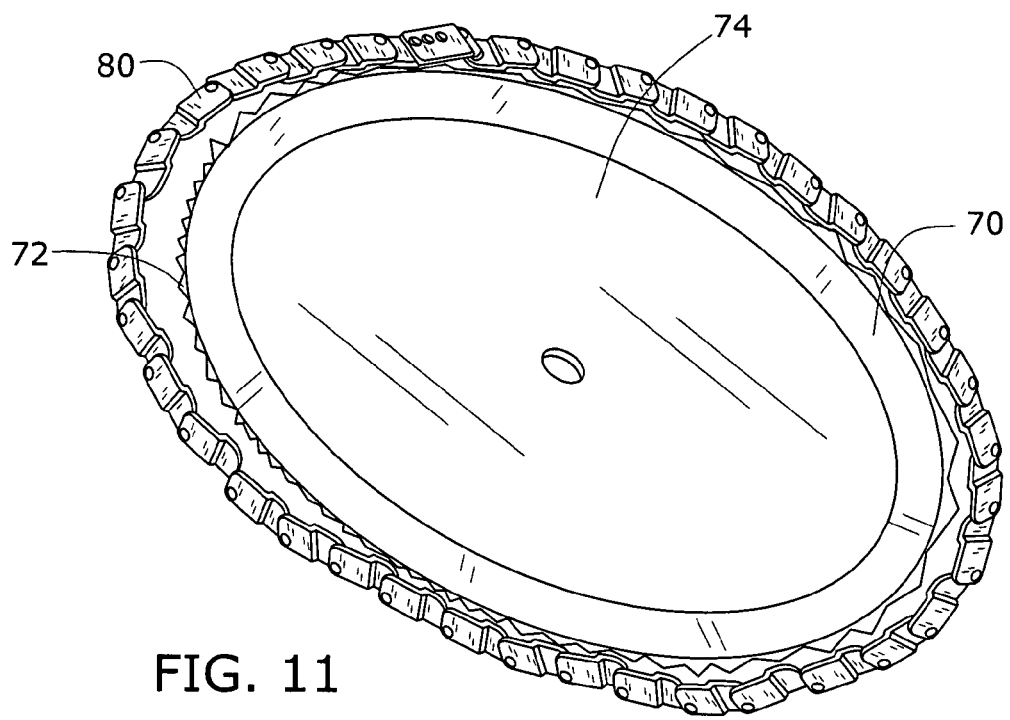
FIG. 11 illustrates yet another embodiment of the protective blade cover of the present invention, where in this case an unsharpened edge region of the blade is permitted to remain exposed.

It is a significant aspect of the present invention that by virtue of utilizing a plurality of links to form a blade cover, the inventive cover may be used with virtually any blade design and topology. More specifically, the inventive linked blade cover may be used with non-circular blades. FIG. 10 illustrates a protective blade cover 50 of the present invention as disposed to cover a segmented blade 60, where edge portion 62 of blade 60 comprises the sharp, cutting edge and edge portion 64 comprises a flat edge surface. FIG. 11 illustrates yet another non-circular blade 70, with a protective blade cover 80 of the present invention disposed to cover sharpened edge portion 72. In this case, blade cover 80 is configured to extend between the ends of the blade and need not cover periphery 74, which does not exhibit a blade edge. By virtue of its linked design, protective blade cover 80 of the present invention is capable of properly accommodating to the geometry of this particular blade.

It is to be understood that the individual links 12, as well as mater link assembly 14, may be formed of any suitable, rigid material. In a preferred embodiment, the links and assembly are formed of a relatively hard plastic material that may be injection molded into required configuration. Moreover, links of different size may be formed of different colors, to allow for the links to be easily organized. The coloring may be used for other purposes, such as for safety issues.

What is claimed is:

1. A protective cover for encasing a saw blade cutting edge comprising:

a plurality of linking members, each linking member formed of a rigid housing having a recessed inner portion therein for encasing the saw blade cutting edge, said rigid housing further comprising a pair of pivot pins forms at a first end thereof and a pair of pivot apertures formed at a second, opposing end thereof, such that the plurality linking members are removably joined together to form a chain by fitting a pair pins from a first linking member into a pair of apertures from a second, adjacent linking member;

a master link assembly comprising a joining element formed of a rigid housing having a recessed inner portion therein, said rigid housing further comprising a pair of pivot pins formed at a first end thereof for coupling to a pair of pivot apertures of a first terminal linking member, forming a first end of the protective cover chain, and at least a pair of pivot apertures formed at a second, opposing end thereof; and a fitting element formed of a rigid housing having a recessed inner portion therein, said rigid housing further comprising a pair of pivot apertures formed at first end thereof for coupling to a pair of pivot pins of a second terminal linking member, forming a second end of the protective cover chain, and a plurality of pairs of pivot apertures formed at a second, opposing end thereof, wherein the joining element is inserted into the recessed inner portion of the fitting element and a selected pair of fitting element pivot apertures are aligned with a selected pair of pivot apertures of the joining element; and a locking mechanism disposed through the aligned pivot apertures of the joining element and the fitting element to fix the plurality of linking members as the protective cover for disposition around the saw blade cutting edge.

2. A protective cover as defined in claim 1 wherein the plurality of linking members and the master link assembly comprise a plastic material.

3. A protective cover as defined in claim 2 wherein the plurality of linking members and the master link assembly comprise injunction-molded plastic elements.

4. A protective cover as defined in claim 1 wherein the locking mechanism comprises a threaded bolt and nut combination disposed through the coupled arrangement of the joining element and the fitting element.

5. A protective cover as defined in claim 1 wherein the color of the plurality of linking members is associated with the size of said members.

6. A protective cover as defined in claim 1 wherein one or more linking members are deleted from the chain to modify the length of the chain.

7. A protective cover as defined in claim 1 wherein one or more linking members are added to the chain to modify the length of the chain.

* * * * *